(12) United States Patent
Clough et al.

(10) Patent No.: US 7,349,951 B2
(45) Date of Patent: Mar. 25, 2008

(54) SYSTEMS AND METHODS FOR ACCESSING A PRINTING SERVICE

(75) Inventors: James Clough, Boise, ID (US); Dennis Howard, Eagle, ID (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 924 days.

(21) Appl. No.: 10/436,180

(22) Filed: May 12, 2003

(65) Prior Publication Data

US 2004/0227971 A1 Nov. 18, 2004

(51) Int. Cl.
*G06F 15/16* (2006.01)
*G06F 15/173* (2006.01)

(52) U.S. Cl. .................... 709/217; 709/203; 709/218; 709/219; 709/238; 726/15

(58) Field of Classification Search ........ 709/220–222, 709/203, 217–219, 238; 358/1.15; 726/15
See application file for complete search history.

(56) References Cited

U.S. PATENT DOCUMENTS

| | | | |
|---|---|---|---|
| 5,898,823 A * | 4/1999 | Sorkin et al. ............ 358/1.15 |
| 6,697,354 B1 * | 2/2004 | Borella et al. ........... 370/352 |
| 6,701,437 B1 * | 3/2004 | Hoke et al. .............. 726/15 |
| 6,735,625 B1 * | 5/2004 | Ponna ..................... 709/223 |
| 6,748,471 B1 * | 6/2004 | Keeney et al. ............ 710/220 |
| 6,768,743 B1 * | 7/2004 | Borella et al. ............ 370/401 |
| 6,785,542 B1 * | 8/2004 | Blight et al. ............ 455/426.1 |
| 6,993,562 B2 * | 1/2006 | Treptow et al. ........... 709/206 |
| 7,152,116 B1 * | 12/2006 | Austin et al. ............. 709/245 |
| 2002/0138564 A1 * | 9/2002 | Treptow et al. ........... 709/203 |
| 2003/0182363 A1 * | 9/2003 | Clough et al. ............ 709/203 |
| 2004/0227971 A1 | 11/2004 | Clough et al. |
| 2004/0227973 A1 * | 11/2004 | Taylor ...................... 358/1.15 |
| 2004/0230646 A1 | 11/2004 | Clough et al. |
| 2004/0246514 A1 | 12/2004 | Clough et al. |
| 2004/0246518 A1 | 12/2004 | McKinley |
| 2004/0249733 A1 | 12/2004 | Clough et al. |
| 2004/0250129 A1 | 12/2004 | Clough et al. |
| 2004/0257606 A1 | 12/2004 | Bergstrand et al. |

OTHER PUBLICATIONS

The Microsoft Computer Didionary. 5th ed. Redmond, WA: Microsoft Press. May 1, 2002.*

* cited by examiner

*Primary Examiner*—Saleh Najjar
*Assistant Examiner*—Brandan Y. Higa

(57) ABSTRACT

Disclosed are systems and methods for accessing a printing service. In one embodiment, a system and a method pertain to attempting to print to the printing service via an internal network address, and if the attempted printing fails, attempting to print to the printing service via an external network address.

21 Claims, 8 Drawing Sheets

SYSTEMS AND METHODS FOR ACCESSING A PRINTING SERVICE

BACKGROUND

Computer users often carry portable computing devices with them such as notebook computers, personal digital assistants (PDAs), and mobile telephones that include computing capabilities. Such users may at some point wish to print data from the portable computing device while remote from the user's work or home network. For instance, a mobile user may wish to print when at a coffee shop that provides network (e.g., Internet) access and printing services, or when staying at a hotel that comprises a hotel network that includes a public printing device.

In such scenarios, it is likely that the user has little or no knowledge of the printing services that are available for use. Furthermore, it is likely that the user lacks the software (or firmware) that is required to communicate with the public printing devices and to send print jobs to them. Although the user can be provided with information as to the availability of printing services as well as any software or firmware (e.g., drivers) that is necessary to print, a more automated public printing system would be preferable, particularly for less computer-savvy users. Moreover, desirable would be a public printing system that is substantially universal and therefore may be used within any network that is configured to support such public printing.

Several obstacles exist to the creation and implementation of such a public printing system. For instance, if the mobile user establishes a virtual private network (VPN) connection, that user may not be able to print to the public printing device. Therefore, if the user wishes to print out a copy of a document stored on his work network that he forgot to take along on a business trip, the user may not be able to print out that document at his hotel without first downloading it to his computing device and disconnecting the VPN connection.

The reason for such inability to access the public printing device, and any other local devices, is that, assuming that the VPN comprises a single tunnel VPN, all traffic from the computing device is routed through the VPN so that it cannot reach the local device except via the external network with which the VPN is formed. Although it would be possible to print a document stored on the external network using a proxy server of the external network, a problem exists as to how to connect to the printing device in that no one network address may be used to receive both internal and external print jobs.

SUMMARY

Disclosed are systems and methods for accessing a printing service. In one embodiment, a system and a method pertain to attempting to print to the printing service via an internal network address, and if the attempted printing fails, attempting to print to the printing service via an external network address.

BRIEF DESCRIPTION OF THE DRAWINGS

The disclosed systems and methods can be better understood with reference to the following drawings. The components in the drawings are not necessarily to scale.

DETAILED DESCRIPTION

Disclosed herein are example embodiments of systems and methods that facilitate public printing. Although particular embodiments are disclosed, these embodiments are provided for purposes of example only to facilitate description of the disclosed systems and methods.

Figure 1:
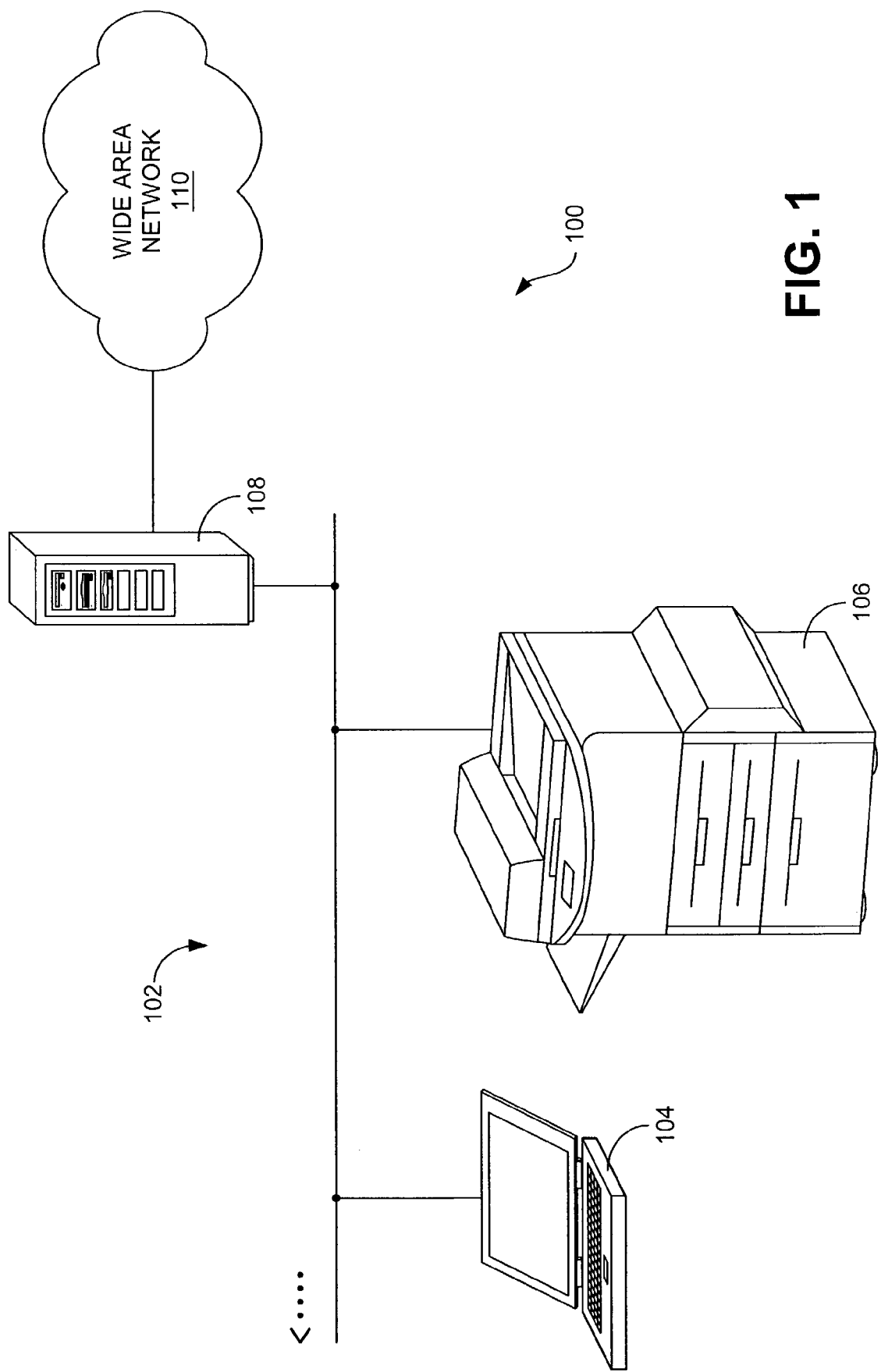
FIG. 1 is a schematic view of an embodiment of a system that facilitates public printing.

Referring now in more detail to the drawings, in which like numerals indicate corresponding parts throughout the several views, FIG. 1 illustrates an example system 100 that facilitates public printing. As indicated in this figure, the system 100 includes a local or internal network 102 to which a computing device 104, a printing device 106, and a server computer 108 are connected. The internal network 102 is assumed to comprise a network that is unfamiliar to the mobile user. By way of example, the internal network 102 comprises a hotel network to which the user can connect from the user's hotel room. Although a hotel network is explicitly identified for purposes of discussion, the internal network 102 more generally comprises any network (wired or wireless) that a mobile user may wish to connect to and print over.

As is depicted in FIG. 1, the computing device 104 can be a notebook (or "laptop") computer. More generally, however, the computing device 104 comprises a portable computing device that the mobile user may carry, for instance, while on a business trip. Accordingly, the computing device 104 can, alternatively, comprise one of a personal digital assistant (PDA), tablet computer, mobile telephone, etc. Irrespective of its configuration, the computing device 104 is connectable to the internal network 102 such that the computing device can communicate with one or both of the printing device 106 and the server computer 108. This connection may comprise either a wired connection or a wireless connection (e.g., via a radio frequency (RF) communication protocol). Stored on the computing device 104 is client software (or firmware) that is used to access and use a public printing service facilitated by a printing service manager.

The printing device 106 comprises any device that can receive print jobs via the internal network 102 and generate hardcopy documents associated with the received jobs. By way of example, the printing device 106 comprises a laser printer. However, other configurations are possible. For instance, the printing device 106 can be a multi-function peripheral (MFP) device that is capable of printing as well as performing other tasks such as copying, scanning, faxing, emailing, etc. As is described in greater detail below, the printing device 106 can comprise an embedded printing service manager that facilitates public printing.

The server computer 108 links the internal network 102 to an external wide area network (WAN) 110, such as the Internet, and therefore acts as a gateway between the internal network and the WAN. As is described below, the server computer 108 is configured to intercept initial communications directed at devices located outside of the internal network 102 (i.e. on the WAN 110). Such interception may be used to, for example, charge users for Internet access and/or offer printing services to the user. In the latter case, the server computer 108 may be configured to provide a link to the printing service manager that is, for instance, embedded in the printing device 106.

In addition to acting as the network gateway, the server computer 108 (or a separate-computer if desired) may be used to provide the network address (e.g., Internet protocol (IP) address) of the printing service manager. Furthermore, the server computer 108 may facilitate billing for rendered printing services by, for instance, posting printing charges to a bill (e.g., hotel bill) or forwarding billing information to a credit card processing service connected to the WAN 110. It is noted that, in some embodiments, the printing service manager, or a portion thereof, may exist on the server computer 108 or another device connected to the network 102.

Figure 2:
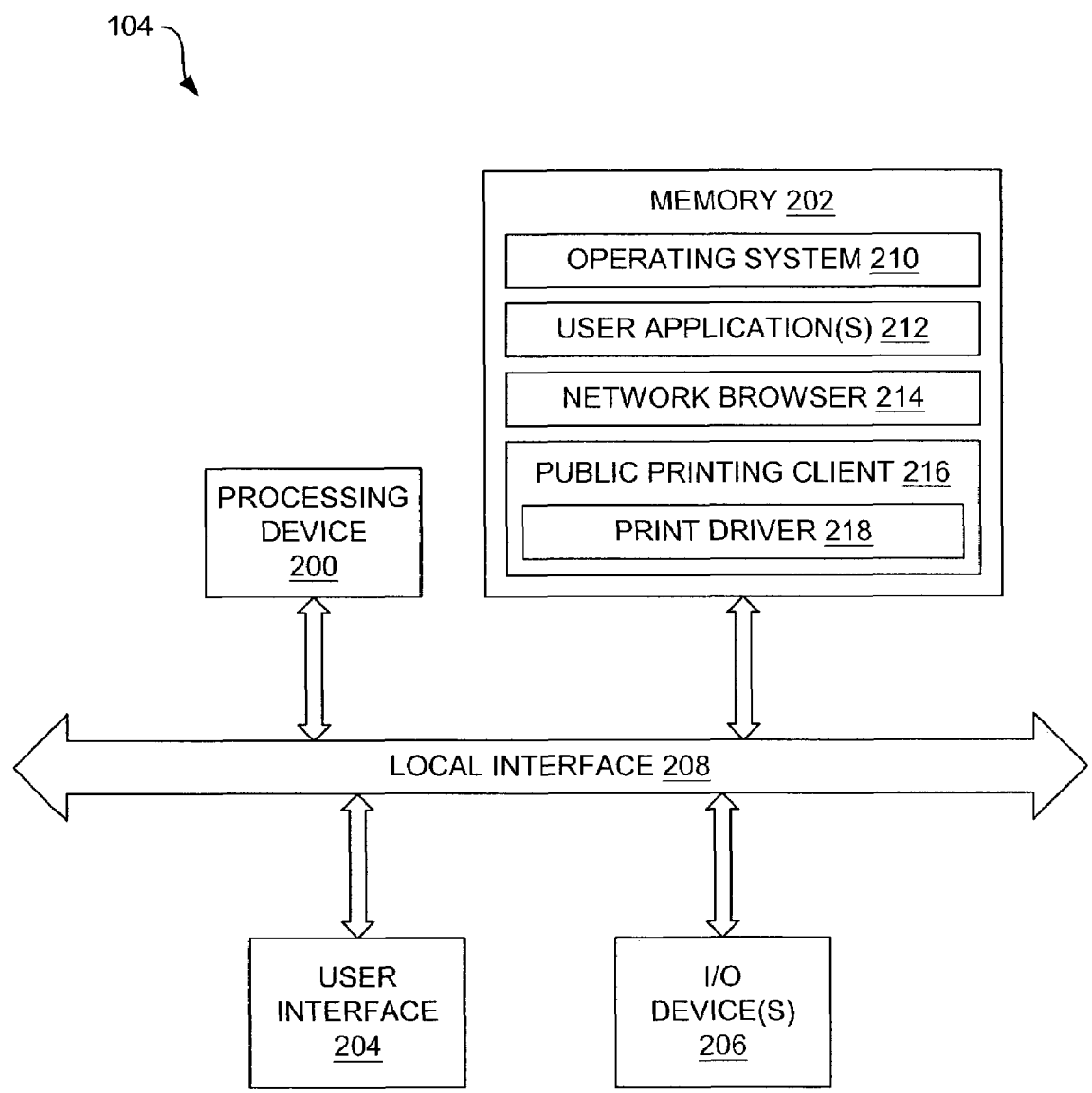
FIG. 2 is a block diagram of an embodiment of a computing device shown in FIG. 1.

FIG. 2 is a block diagram illustrating an example architecture for the computing device 104 shown in FIG. 1. As indicated in FIG. 2, the computing device 104 comprises a processing device 200, memory 202, a user interface 204, and at least one input/output (I/O) device 206. Each of these components is connected to a local interface 208 that, for instance, comprises one or more internal buses.

The processing device 200 is adapted to execute commands stored in memory 202 and can comprise a general-purpose processor, a microprocessor, one or more application-specific integrated circuits (ASICs), a plurality of suitably configured digital logic gates, or other electrical configurations that coordinate the overall operation of the computing device 104. The memory 202 comprises any one or a combination of volatile memory elements (e.g., random access memory (RAM)) and nonvolatile memory elements (e.g., Flash memory, hard disk, etc.) that store or cache data.

The user interface 204 comprises the tools with which user data and commands are input into the computing device 104. In situations in which the computing device 104 comprises a notebook computer, the user interface 204 at least comprises a keyboard and a display. In other embodiments, the user interface may comprise one or more of function keys, buttons, a touch-sensitive display, and a stylus.

The one or more I/O devices 206 facilitate communications with other devices and may include one or more serial, parallel, small computer system interface (SCSI), universal serial bus (USB), or IEEE 1394 (e.g., Firewire™) components, as well as one or more of a modulator/demodulator (e.g., modem), network card, wireless (e.g., RF) transceiver, or other communication component.

The memory 202 includes various programs, in software and/or firmware, including an operating system 210, one or more user applications 212, and a network browser 214. The operating system 210 controls the execution of other software and provides scheduling, input-output control, file and data management, memory management, and communication control and related services. The user applications 212 comprise the programs that may be used to create and/or identify data (e.g., documents) that is to be printed by the service and, more particularly, by the printing device 106. By way of example, these applications comprise one or more of a word processing application, a spreadsheet application, a presentation application, a scheduling application, etc. The network browser 214 comprises a program with which the user can access, via the internal network 102, network sites and pages. By way of example, the network browser 214 is an Internet browser that retrieves Web sites and Web pages. The network browser 214 can be used to access the printing service manager.

In addition to those programs, the memory 202 comprises a public printing client 216. As is described in greater detail below, the public printing client 216 operates in conjunction with the printing service manager to facilitate public printing. By way of example, the public printing client 216 can be downloaded from the printing service manager or from a suitable source on the WAN 110. In any case, however, once stored on the computing device 104, the public printing client 216 can be used to facilitate public printing on any network in which an appropriate printing service manager is provided, thereby providing a substantially universal printing solution.

As is further identified in FIG. 2, the public printing client 216 includes a print driver 218 that is used to translate documents into an appropriate print format. Alternatively, however, the driver 218 could comprise part of the operating system 210. In preferred embodiments, the print driver 218 is a universal driver that can be used in conjunction with substantially any printing device that may be accessed via a compatible printing service manager. Examples of operation of the public printing client 216, and its print driver 218, are provided below.

Figure 3:
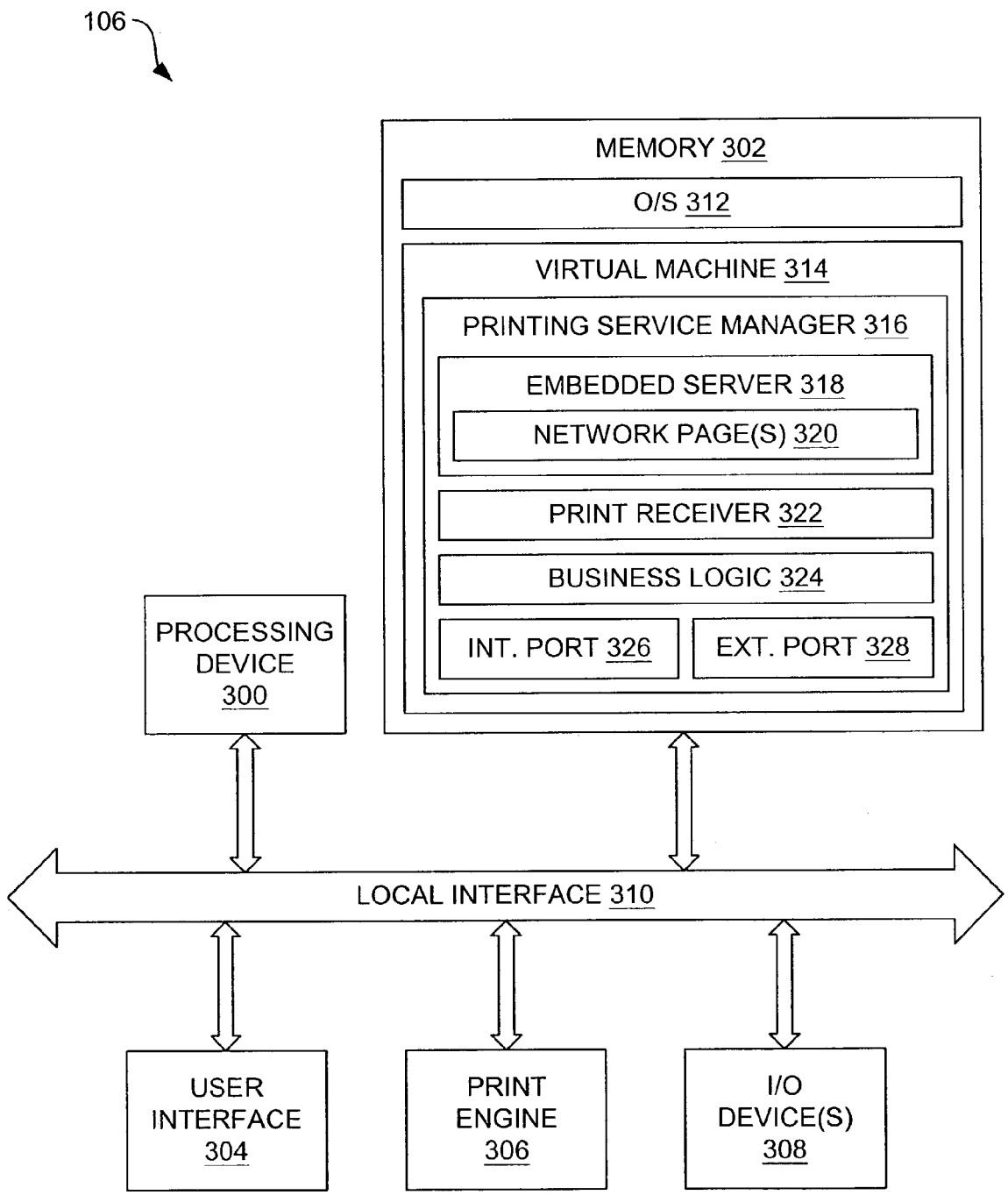
FIG. 3 is a block diagram of an embodiment of a printing device shown in FIG. 1.

FIG. 3 is a block diagram illustrating an example architecture for the printing device 106 shown in FIG. 1. As indicated in FIG. 3, the printing device 106, like the computing device 104, comprises a processing device 300, memory 302, a user interface 304, and at least one I/O device 308, each of which is connected to a local interface 308. In addition, however, the printing device 106 comprises a print engine 306.

The processing device 300, memory 302, and I/O devices 308 have similar configurations to like-named components of the computing device 104 described in relation to FIG. 2. The user interface 304 comprises the components with which users input commands and modify device settings, such as a control panel that incorporates a display (e.g., liquid crystal display (LCD)) and a series of keys or buttons.

The memory 302 comprises various programs, in software and/or firmware, including an operating system 312 and, in this embodiment, a virtual machine 314. The operating system 312 contains the various commands that are used to control the general operation of the printing device 106. The virtual machine 314 is a program that functions as a self-contained operating environment and facilitates operation of a printing service manager 316 that, as noted above, facilitates public printing. Although a virtual machine is explicitly shown and identified, its functionality could, alternatively, be provided by software or firmware stored in the printing device 106. In the embodiment of FIG. 3, however, the manager 316 comprises an applet (e.g., written in the Chai™ programming language of the Hewlett-Packard Company) that includes an embedded server 318, a print receiver 322, and business logic 324. It is noted that, although the printing service manager 316 is shown as executing on the printing device 106, it could alternatively be provided on a separate device, such as the server computer 108 or another device connected to the internal network 102, if desired.

The embedded server 318 is configured to serve network pages 320, for instance Web pages, to requesting devices such as the computing device 104. As is described below, these pages contain information for the user as to how to use the public printing system hosted by the printing service manager 316, how to obtain public printing client software, the cost of the printing services, the methods of paying for those services, etc.

The print receiver 322 is a module that is configured to receive print jobs transmitted to the printing device 106 via the internal network 102. By way of example, the print receiver 322 is specifically configured to receive hypertext transfer protocol (HTTP) and/or secure HTTP (HTTPS) communications. These communications can be received via an internal port 326 and an external port 328 that each has its own network address (e.g., universal resource locator (URL)) that is used to access the port. In some embodiments, the internal port 326 and the external port 328 may comprise the same port. When a print job is received, the print receiver 322 forwards the job to the print engine 306 for printing.

Once printing has been successfully performed, billing (assuming the printing services are provided on a pay basis) is facilitated using the business logic 324. Operation of the business logic 324 depends upon the particular implementation and method of billing that is to be used. By way of example, the business logic 324 is configured to communicate printing charges to the server computer 108 for purposes of posting those charges to a bill (e.g., hotel bill) or contacting an appropriate credit card processing service.

Various programs (i.e. logic) have been described herein. These programs can be stored on any computer-readable medium for use by or in connection with any computer-related system or method. In the context of this document, a "computer-readable medium" is any electronic, magnetic, optical, or other physical device or means that contains or stores a computer program for use by or in connection with a computer-related system or method. These programs can used by or in connection with an instruction execution system, apparatus, or device, such as a computer-based system, processor-containing system, or other system that can fetch the instructions from the instruction execution system, apparatus, or device and execute the instructions.

An example system having been described above, an example of operation of the system in facilitating public printing will now be discussed in relation to the flow diagram of FIGS. 4A and 4B. It is noted that process steps or blocks in the flow diagrams of this disclosure may represent modules, segments, or portions of code that include one or more executable instructions for implementing specific logical functions or steps in the process. Although particular example process steps are described, alternative implementations are feasible. Moreover, steps may be executed out of order from that shown or discussed, including substantially concurrently or in reverse order, depending on the functionality involved.

Figure 4A:
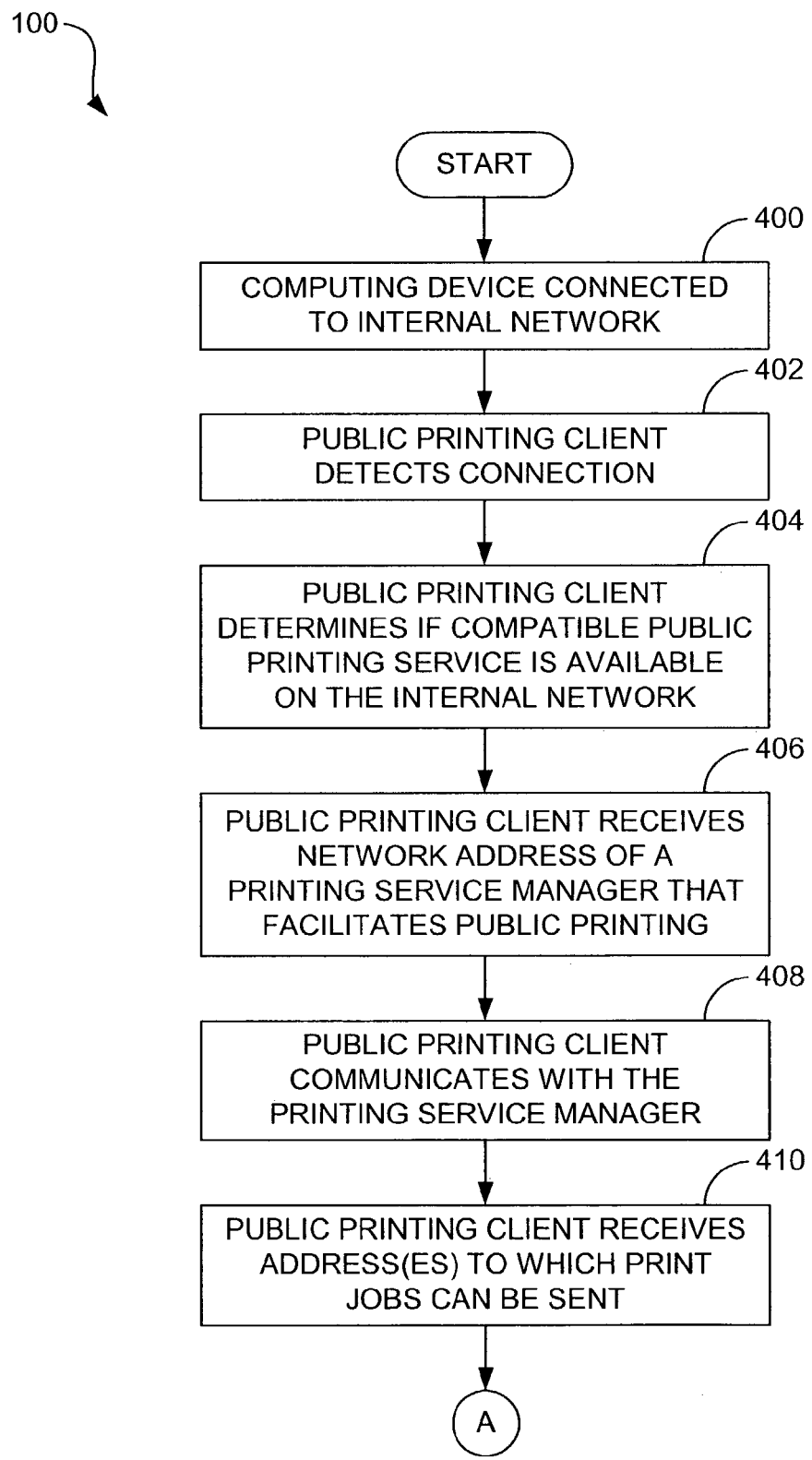
FIGS. 4A and 4B provide a flow diagram that illustrates an embodiment of a method for facilitating public printing using the system of FIG. 1.

Beginning with block 400 of FIG. 4A, the computing device 104 (FIG. 1) is connected to the internal network 102. By way of example, the computer user may physically connect his or her notebook computer to a hotel network (e.g., high speed data port in the user's hotel room). Once the computing device 104 is connected to the network 102, the public printing client 216 (FIG. 2) on the computing device detects the connection, as indicated in block 402. Such detection can be made because the public printing client 216 continuously runs in the background on the computing device 104 and therefore continually monitors the network state of the device. Notably, the public printing client 216 could have been installed in a previous public printing session. For example, during that session, the computer user could have been made aware of the availability of the client software and the printing services it facilitates by, for example, a Web page served by the server computer 108. In such a case, the client software could have been obtained by, for instance, retrieving it from a server connected to the WAN 110 and operated by or on the behalf of the client software developer.

Referring next to block 404, the public printing client 216 determines if a compatible public printing service is available on the internal network 102. This determination can be made by performing a domain name service (DNS) lookup for a domain name associated with the public printing service that a DNS server (e.g., server computer 108) is configured to recognize. By way of example, a DNS lookup of the name "mobile printing" can be performed. If a compatible public printing service is available, the public printing client 216 receives a network address of a printing service manager 316 (FIG. 3) that facilitates such public printing, as indicated in block 406. More particularly, the public printing client 216 receives an Internet protocol (IP) address of the printing service manager 316, for example stored on the printing device 106 or the server computer 108 as the case may be.

Once the public printing client 216 receives the address of the printing service manager 316, the public printing client makes a call to that address so that the client can communicate with the printing service manager 316, as indicated in block 408. Such communications are supported using an appropriate network protocol, such as HTTP or HTTPS. Through these communications, the public printing client 216 receives one or more network addresses to which print jobs can be sent for printing by one or more available printing devices 106, as indicated in block 410. By way of example, the address or addresses comprise one or more URLs that identify input ports (e.g., the internal and external ports) of the printing service manager 316 on the printing device 106 or the server computer 108. This information, as well as other information that facilitates printing, can, for instance, be contained in an extensible markup language (XML) document that is transmitted from the printing service manager 316 to the public printing client 216. At this point, the public printing client 216, and therefore the computing device 104, has completed a public printing service discovery process and therefore is prepared to print to the printing device 106.

The user can learn about the public printing service in various ways. For example, when the user opens the network browser 214, the server computer 108 can intercept that connection and inform the user as to the availability of the public printing service and provide a link to the printing service manager 316. Assuming the user wishes to use or is considering using the public printing service, the user can then select the link and receive one or more network (e.g., Web) pages from the embedded server 318 of the printing service manager 316 that explain how to use the service, how much the service costs (e.g., price per page), how the user is billed, where printed documents may be picked up, etc.

Figure 4B:
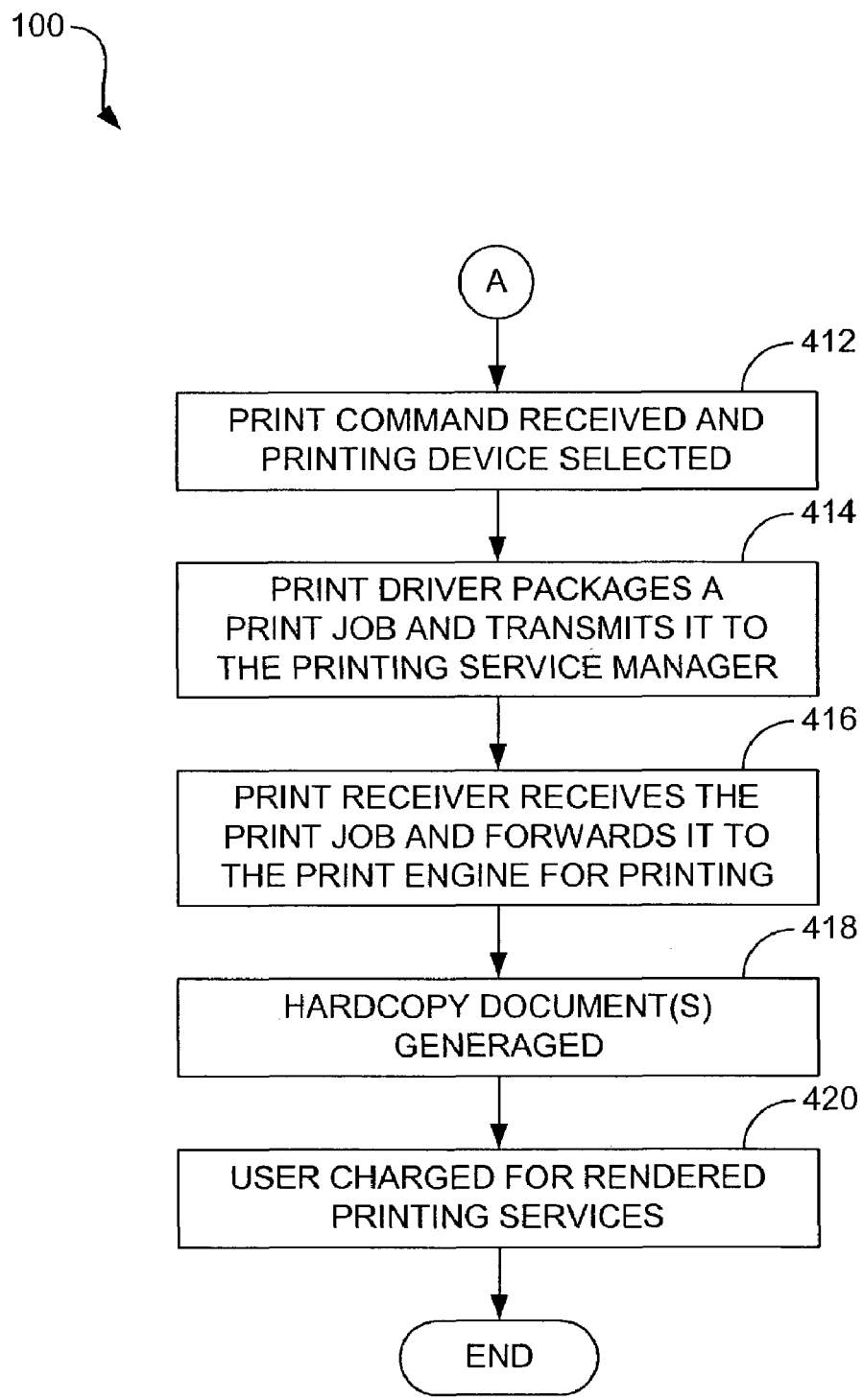

At print time, a print command is received and a printing device is selected, as indicated in block 412 of FIG. 4B. By way of example, the print command and printing device selection are made using a "File, Print" process in which the user is presented with a list of available printing devices from which to choose. In such a case, the presented list includes the printing device 106 connected to the internal network 102. After the print command and printing device selection have been entered, and assuming the user selected the printing device 106, the public printing client 216 packages a print job and transmits it to the printing service manager 316, as indicated in block 414. Alternatively, however, packaging of the print job can have occurred previous to entry of the print command and printing device selection. Preferably, the print job is transmitted using a secure network protocol such as HTTPS. Regardless, the print job is transmitted to an address (e.g., URL) that the public printing client 216 received in block 410 described above.

After or while the print job is transmitted, the print receiver 322 of the printing service manager 316 receives the print job and forwards it to the print engine 306 for printing, as indicated in block 416, so that, as indicated in block 418, one or more hardcopy documents are generated. If the printing service manager 316 is executing, on a device separate from the printing device 106, for instance on the server computer 108, the print job is transmitted from that device to the printing device using substantially any available transmission method (wired or wireless). Once printing has been successfully completed (in whole or in part), the user is charged for the printing services rendered, as indicated in block 420. As noted above, such a charge can be, for instance, added to a hotel bill or forwarded to a credit card processing service for debiting of a credit card account. Assuming no other documents are to be printed, flow for the public printing session is then terminated.

As noted above, several obstacles exist to the creation and implementation of a public printing system such as that described in relation to FIGS. 1-4. For instance, if the mobile user establishes a virtual private network (VPN) connection, that user may not be able to print directly to the public printing service. As is discussed in the following, however, this problem can be overcome by using an internal port (e.g., port 326) that receives print jobs from within the internal network 102, and an external port (e.g., port 328), that receives print jobs from outside the internal network.

Figure 5:
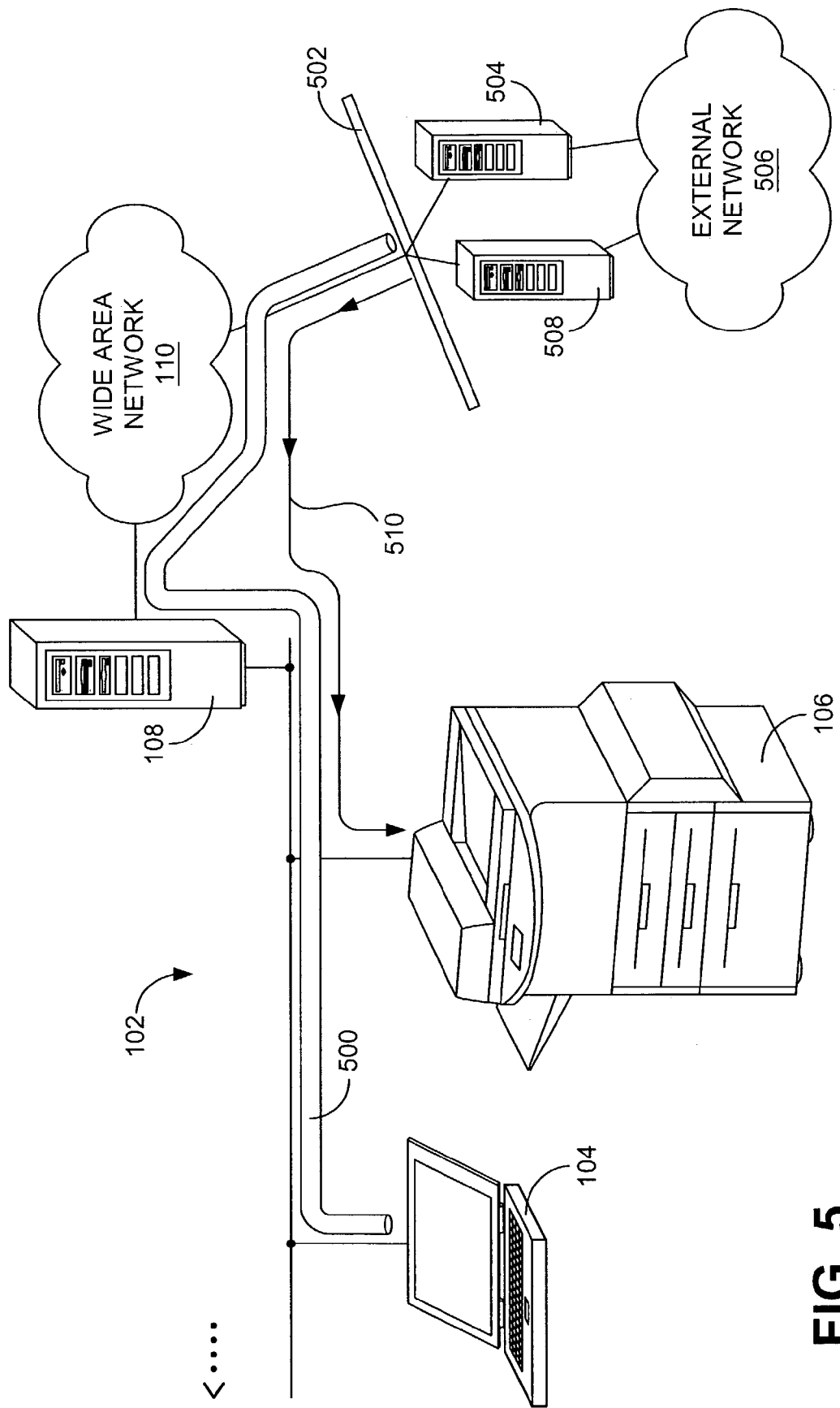
FIG. 5 is a schematic view of the system of FIG. 1 in a case in which the user has established a virtual private network connection with an external network.

FIG. 5 illustrates a VPN connection that has been established in the system 100 shown in FIG. 1. As is shown in FIG. 5, a VPN tunnel 500 extends from, the computing device 104, along the internal network 102, out from the server computer 108 (i.e. gateway), through the WAN 110, through a firewall 502, and to a VPN server 504 connected to an external network (e.g., an enterprise network) 506 behind the firewall. The tunnel 500 comprises an encrypted channel that permits the user to access data (e.g., documents) on the external network 506 as if the computing device 104 were physically connected to the network. For the purposes of this example, the tunnel 500 is a single path tunnel that routes all computing device traffic to the external network 506. As is described in the following, documents available on the external network 506 can be accessed via the VPN tunnel 500, and a print job for those documents can be delivered, for instance from a proxy server 508, to an external port (e.g., port 328) of the printing service manager 316 (FIG. 3) executing on the printing device (as indicated by line 510) so as to facilitate "local" public printing.

As described above in relation to FIGS. 4A and 4B, the internal and external network addresses of the printing service manager ports can, for instance, be obtained through a discovery process that begins with a DNS lookup request for a domain name associated with the public printing service. In response to that request, the public printing client 216 (FIG. 2) receives an IP address of the printing service manager 316. Once that address is received, the public printing client 216 makes a call to the printing service manager 316 to request various information from the manager including its internal and external network addresses.

As a response to the request, the public printing client 216 receives the internal and external network addresses from the printing service manager 316, for instance in an XML document. In preferred embodiments, these addresses comprise separate URLs, the first of which may be used to access the printing service manager 316 from within the internal network 102, and the second of which may be used to access the printing service manager from outside the network. At this point, the public printing client 216, and therefore the computing device 104, has completed a public printing service discovery process and is prepared to print to the printing service. Notably, this discovery process occurs prior to the user establishing a VPN connection.

Once the internal and external URLs have been obtained, irrespective of the manner in which they are obtained, the public printing client 216 can then attempt to access the printing service to utilize its printing capabilities. The manner in which this access is achieved depends upon whether a VPN has or has not been established. If no such connection has been established, print jobs may be sent directly to the internal port (internal URL). If, on the other hand, a VPN has been established, print jobs are routed through the external network 506 with which the VPN is formed to the external port (external URL) of the printing service manager 316.

Figure 6A:
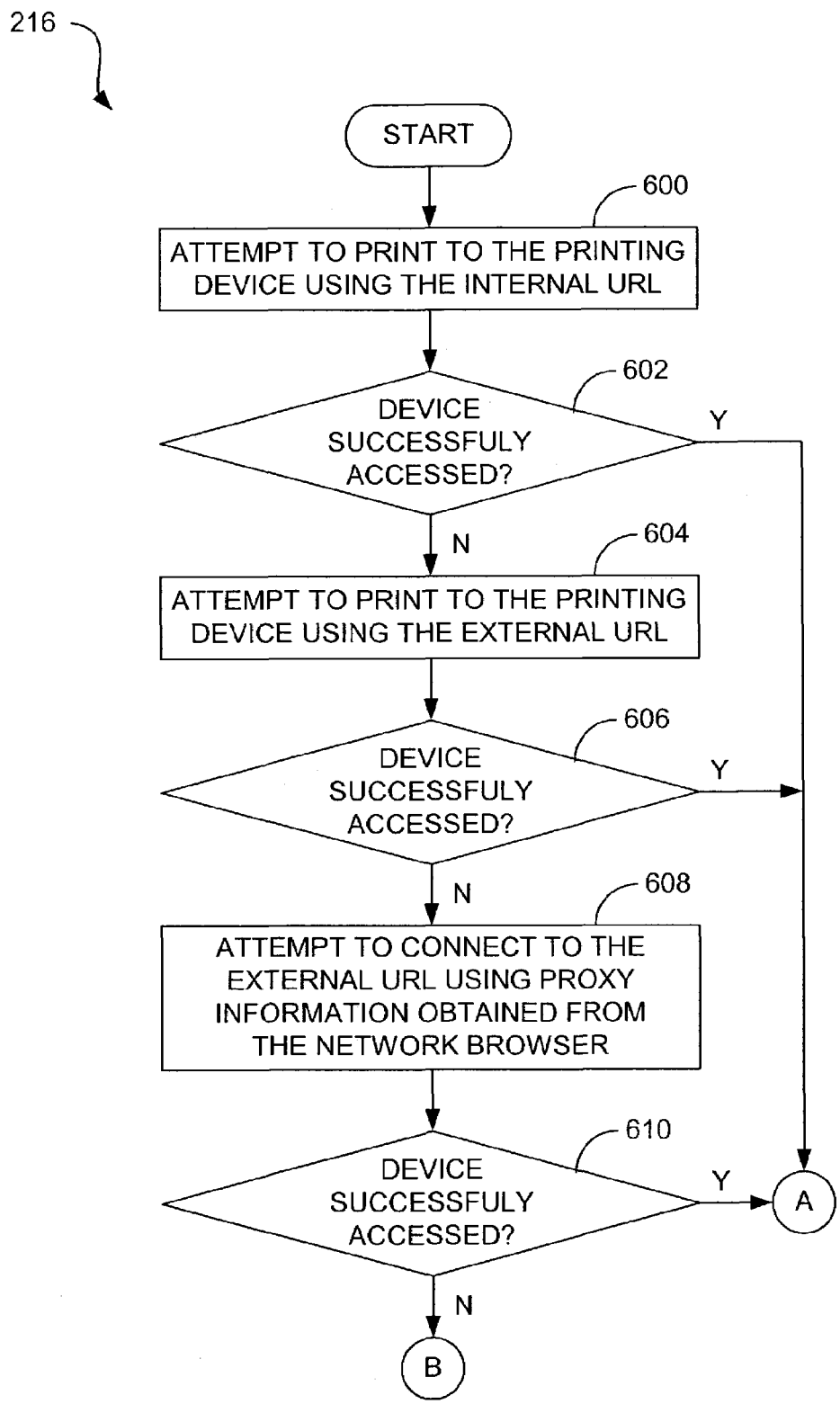
FIGS. 6A and 6B provide a flow diagram that illustrates an embodiment of a method for accessing a printing service that is used irrespective of whether a virtual private network connection has been established.
Figure 6B:
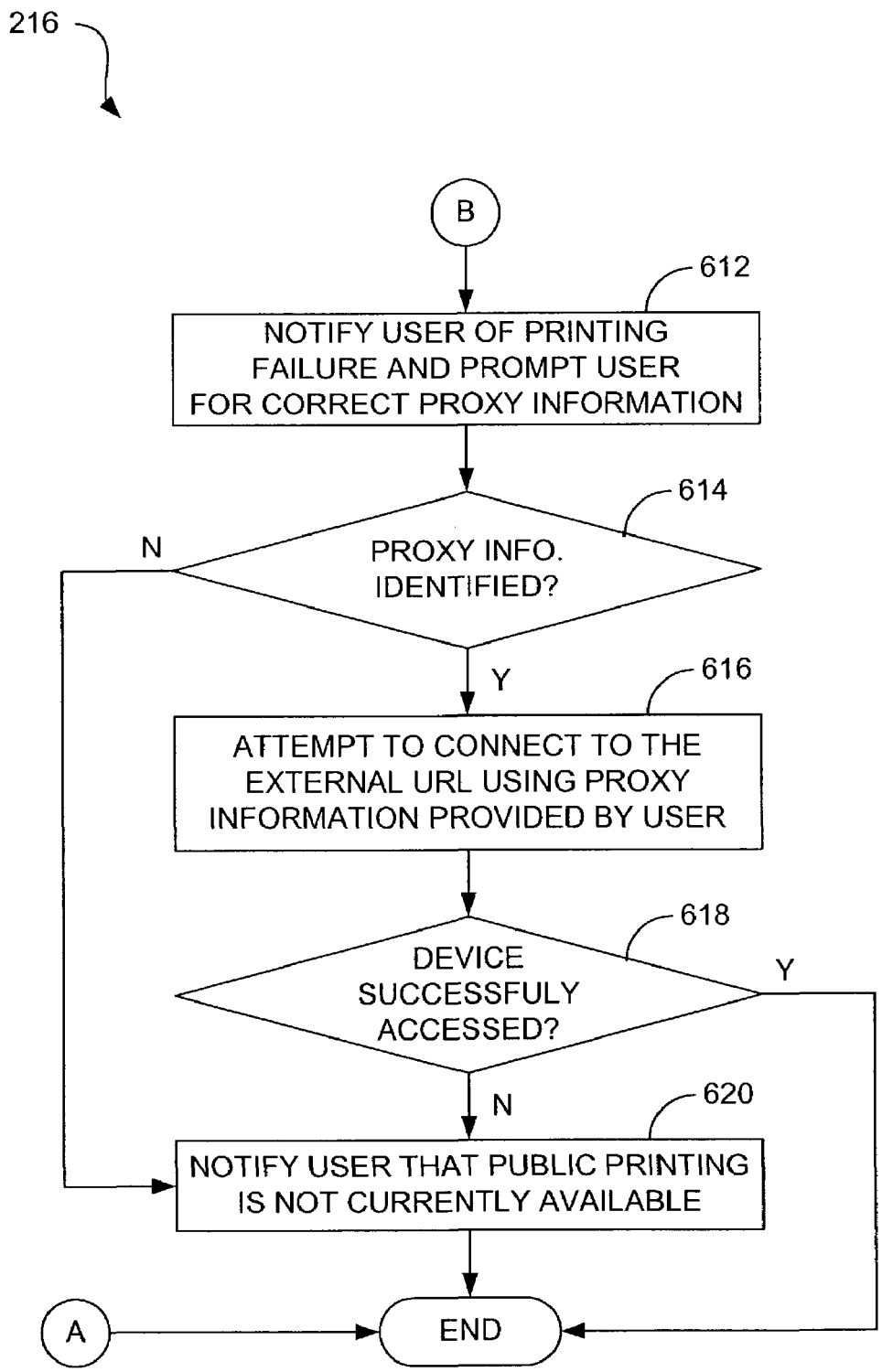

FIGS. 6A and 6B illustrate an embodiment of one method for accessing the printing service at print time. More particularly, FIGS. 6A and 6B provide an example of operation of the public printing client 216 (FIG. 2) in determining how to access the printing service manager 316 (FIG. 3) (e.g., executing on the printing device 106 (FIG. 1) or server computer 108). As will be apparent from the discussion of FIGS. 6A and 6B, the described method can he used irrespective of whether a VPN has or has not been established by the user.

Beginning with block 600 of FIG. 6A, the public printing client 216 attempts to print to the printing service using the internal URL that it received during the discovery process described above. Specifically, the public printing client 216 sends initial communications to the printing service manager, 316 using a secure network protocol, such as HTTPS, to the internal URL. With reference to decision block 602, it is next determined whether the printing service was successfully accessed. This determination is made from communications (or lack thereof) from the printing service manager 316. For instance, if no response is received to the initial communications, the printing service has not been successfully accessed and the current print path is unavailable. Assuming a positive reply is received from the printing service manager 316, the print data can be successfully transmitted to a printing device 106 and one or more hardcopy documents will be generated. In such a case, flow for the public printing client 216 is terminated for the current printing session.

If no reply is received from the printing service manager 316, the user may have established a VPN connection that prevents such access. Accordingly, the public printing client 216, next, as indicated in block 604, attempts to print using the external URL that it received in the discovery process. After such an attempt is made, it is again determined whether the printing service was successfully accessed, as indicated in decision block 606. If so, the print data can be successfully routed from the computing device 104, along the VPN tunnel 500 to the external network 506, and out to the external port 328 of the printing service manager. In such a case, one or more hardcopy documents will be generated by a printing device 106.

If the printing service was not successfully accessed, however, it is possible that a VPN connection has been established by the user, but proxy information (e.g., host name of the proxy server, proxy server port, etc.) is required to transmit the print job via the proxy server 508 connected to the external network 506. Accordingly, the public printing client 216 next, as indicated in block 608, attempts to connect to the external URL using proxy information contained in the network browser 214. In particular, the proxy configuration information stored in the system registry of the computing device 104 is consulted to determine if any proxy settings have been previously established and, if so, printing is again attempted using the proxy information. After such an attempt is made, it is again determined whether the printing service was successfully accessed, as indicated in decision block 610. If so, the print job can be successfully routed to the external port 328 of the printing service manager 316 via the proxy server 508, and one or more hardcopy documents will be generated.

Referring next to block 612 of FIG. 6B, if printing was again unsuccessful, the user is notified, for instance with a pop up dialog box, that printing failed. This failure could have occurred because the computing device 102 is not connected to an appropriate network, or because the proxy information obtained from the network browser 214 is not correct for the proxy server 508 to be used to send the print job to the printing service. Because of the latter possibility, the user is prompted to provide the correct proxy information (block 612). Once the user is so prompted, it is determined whether such proxy information is identified, as indicated in decision block 614. If not, flow continues down to block 620 described below. If proxy information is provided, however, the public printing client 216 again attempts to connect to the external URL, this time using the proxy information provided by the user, as indicated in block 616.

At this point, it is once more determined whether the service was successfully accessed, as indicated in decision block 618. If so, printing will be successful and flow for the printing session is terminated. If, on the other hand, printing again failed, flow continues to block 620 at which the user is notified that public printing is not available. At this point, the user can, if desired, contact a system administrator to obtain help in accessing and printing to the printing service. Optionally, the user can be prompted for proxy information and printing retried several times before notifying the user that printing is not available.

As noted above, this process can be used irrespective of whether the user has established a VPN connection. If one path of access is determined to viable in the process, the public printing client 216 can, optionally, set that path as a default for the next printing session. If that later attempt at printing fails, however, the public printing client 216 can use a method such as that described in relation to FIGS. 6A and 6B to access the printing service by another path.

What is claimed is:

1. A method for accessing a printing device located on a local internal network, comprising:
 a computing device connecting to the local internal network;
 the computing device, via the local internal network, establishing a virtual private network (VPN) with a remote server on a remote external network;
 a public printing client on the computing device attempting to print a document stored on the computing device by sending a print job directly from the computing device to an internal network address of the printing device;
 the public printing client detecting a failure to access the printing device;

due to the failure to access the printing device, the public printing client presuming the existence of the VPN and attempting to print to the printing device by routing the document from the computing device to the remote server on the remote external network and then to an external network address of the printing device, such that to the printing device local printing can be obtained by routing the document from the computing device to the remote server and then local internal network, out to the remote external network, and back to the local internal network.

2. The method of claim 1, wherein the internal network address is associated with an internal port of the printing device and the external network address is associated with an external port of the printing device.

3. The method of claim 1, wherein attempting to print to an internal network address comprises attempting to print to an internal universal resource locator (URL) of the printing device.

4. The method of claim 1, wherein routing comprises routing the document to an external universal resource locator (URL) of the printing device.

5. The method of claim 1, wherein routing comprises routing the document a virtual private network (VPN) tunnel that extends from the computing device to the remote external network.

6. The method of claim 5, further comprising a proxy server connected to the remote external network transmitting a print job containing the document to the external network address of the printing device.

7. The method of claim 6, wherein transmitting the print job to the printing device comprises transmitting the print job via a secure network protocol.

8. The method of claim 7, wherein transmitting the print job comprises transmitting the print job via secure hypertext transfer protocol (HTTPS).

9. The method of claim 1, wherein if printing from the remote server fails, the public printing client attempting to print to the external network address of the printing device using proxy information obtained from a network browser executing on the computing device.

10. The method of claim 9, wherein if attempting to print to an external network address using proxy information obtained from a network browser fails, the public printing client prompting a user to provide proxy information and attempting to print to the external network address using proxy information provided by the user.

11. A system for public printing, comprising:
 a local printing device that is connected to a local internal network, the local printing device hosting a printing service having an internal port and an external port to which print jobs can be directed; and
 a computer that is also connected to the local internal network and further connected to a remote external network with a virtual private network (VPN) that extends from the local internal network to the remote external network, the computer hosting a public printing client configured to:
  (i) attempt to directly print a document stored on the computer to an internal network address associated with the internal port of the printing service,
  (ii) detect failure to access the printing service,
  (iii) responsive to the detected failure, presume the existence of a VPN, and
  (iv) responsive to the presumed existence of the VPN, attempt to print to the printing device by routing the document from the computing device to the remote server and then to an external network address of the printing device, such that local printing can be obtained by routing the document from the local internal network, out to a remote external network, and then back to the local internal network.

12. The system of claim 11, wherein the public printing client is configured to print to an internal universal resource locator (URL) associated with an internal port of the printing service and to an external URL associated with an external port of the printing service.

13. The system of claim 11, wherein the public printing client is configured to transmit a print job to the printing service via a secure network protocol.

14. The system of claim 13, wherein the public printing client is configured to transmit a print job to the printing service via secure hypertext transfer protocol (HTTPS).

15. The system of claim 11, wherein the public printing client is further configured to print to the external network address using proxy information obtained from a network browser.

16. The system of claim 11, wherein the public printing client is further configured to print to the external network address using proxy information provided by a user of the public printing client.

17. A computer-readable medium that stores a public printing client, the public printing client comprising:
  logic configured to first attempt to print a document stored on a computer connected to a local internal network directly from the computer to an internal network address associated with an internal port of a local printing device that is also connected to the local internal network;
  logic configured to detect failure to access the printing device;
  logic configured to presume that the failure to access occurred due to the presence of a virtual private network (VPN) established between the computer and a remote external network; and
  logic configured to, responsive to the presumed presence of the VPN, next attempt to print to an external network address associated with an external port of the printing device by routing the document from the computing device to a remote server on the remote external network and then to the external network address of the printing device, such that local printing can be obtained by routing the document from the local internal network, out to a remote external network, and then back to the local internal network.

18. The computer-readable medium of claim 17, wherein the public printing client is configured to print to an internal universal resource locator (URL) associated with the internal port of the printing service and to an external URL associated with the external port of the printing service via a secure network protocol.

19. The computer-readable medium of claim 18, wherein the public printing client is configured to transmit a print job to the printing service via secure hypertext transfer protocol (HTTPS).

20. The computer-readable medium of claim 17, further comprising logic configured to print to the external network address using proxy information obtained from a network browser.

21. The computer-readable medium of claim 17, further comprising logic configured to print to the external network address using proxy information provided by a user of the public printing client.

* * * * *